United States Patent [19]
Söderlund

[11] Patent Number: 4,915,514
[45] Date of Patent: Apr. 10, 1990

[54] ROTARY MACHINE EQUIPPED WITH A THRUST BALANCING ARRANGEMENT

[75] Inventor: Frits Söderlund, Saltsjöbaden, Sweden

[73] Assignee: Svenska Rotor Maskiner AB, Stockholm, Sweden

[21] Appl. No.: 391,525
[22] PCT Filed: Feb. 17, 1988
[86] PCT No.: PCT/SE88/00068
§ 371 Date: Jul. 20, 1989
§ 102(e) Date: Jul. 20, 1989
[87] PCT Pub. No.: WO88/06247
PCT Pub. Date: Aug. 25, 1988

[30] Foreign Application Priority Data

Feb. 18, 1987 [SE] Sweden ............... 8700671-4

[51] Int. Cl.$^4$ ............ F16C 39/04; F04C 29/00; F01C 21/02
[52] U.S. Cl. ................... 384/616; 384/611; 384/517; 384/454; 418/203
[58] Field of Search ............ 384/453, 420, 454, 690, 384/609, 613, 611, 619, 620, 517, 616, 624, 556, 506; 418/203, 9

[56] References Cited

U.S. PATENT DOCUMENTS

| 1,279,574 | 9/1918 | Morris | 384/506 X |
| 3,222,991 | 12/1965 | Bone | 384/517 X |
| 3,388,854 | 6/1968 | Olofsson et al. | 418/203 |
| 4,730,995 | 3/1988 | Dewhirst | 384/517 X |

FOREIGN PATENT DOCUMENTS 3111834 10/1982 Fed. Rep. of Germany .
0218587 1/1968 Sweden .

Primary Examiner—Stuart S. Levy
Assistant Examiner—William G. Battista, Jr.
Attorney, Agent, or Firm—Frishauf, Holtz, Goodman & Woodward

[57] ABSTRACT

A housing (1) of a rotary machine comprises a low-pressure side (2) and a high-pressure side (3), working-fluid inlet and outlet channels, and at least one rotor (7), which when the machine is working is urged by a working fluid towards the low-pressure side (2). The rotor includes a thrust balancing arrangement (15, 16) for relieving the load on the thrust bearings (11) of the machine, through the medium of an auxiliary bearing (17) and in dependence on pressure fluid supplied to the thrust balancing arrangement, the pressure of which fluid is contingent on the operating conditions of the machine. A relatively large part of the axial load is taken-up by an auxiliary thrust bearing (17), which is readily replaceable. The auxiliary bearing (17) is mounted on an outermost part of the rotor journal shaft (18), on the high-pressure side (3) of the rotor, between a detachable locking device (27) for the auxiliary bearing (17) and the thrust balancing arrangement. The thrust balancing arrangement is located inwards of the auxiliary thrust bearing and includes two annular piston-cylinder parts (15, 16) which are axially extendible and which are located in a cylindrical recess (14) in the housing (1).

5 Claims, 1 Drawing Sheet

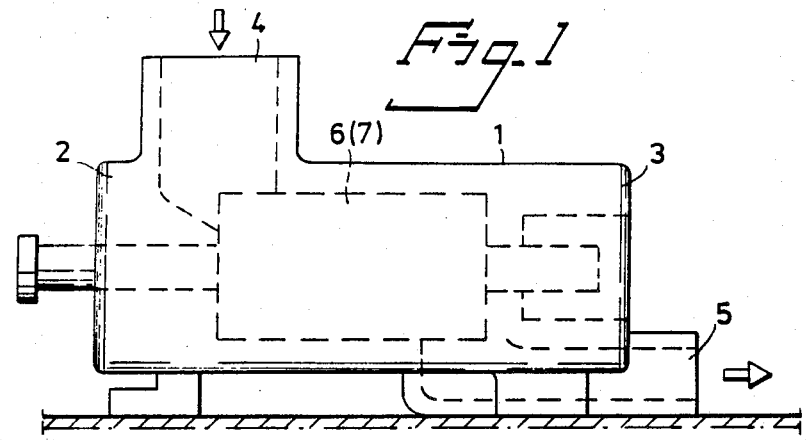
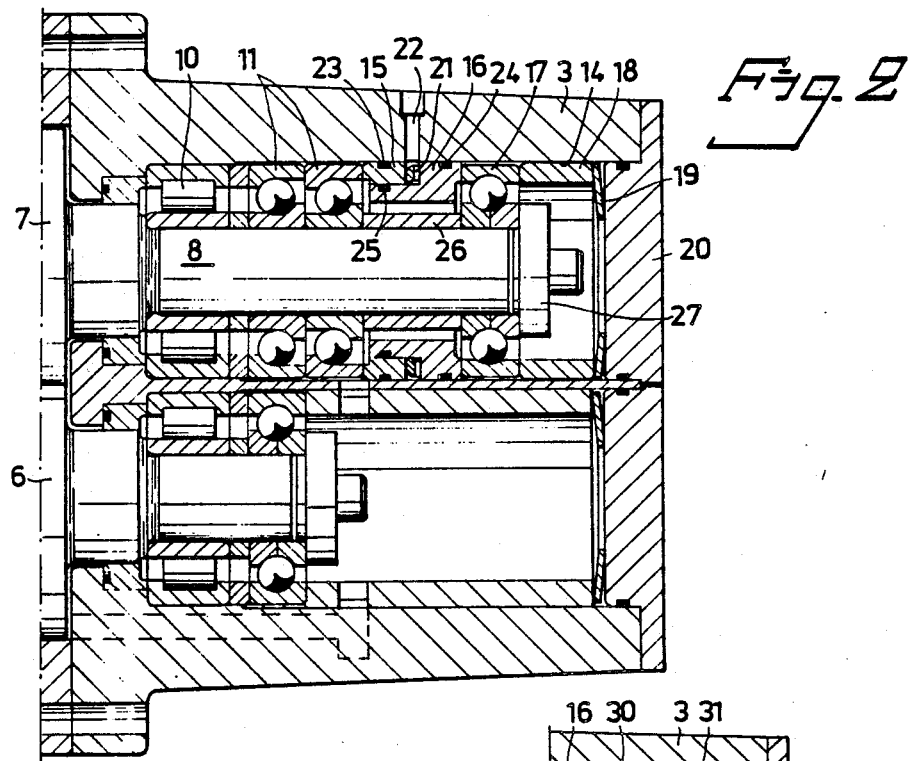
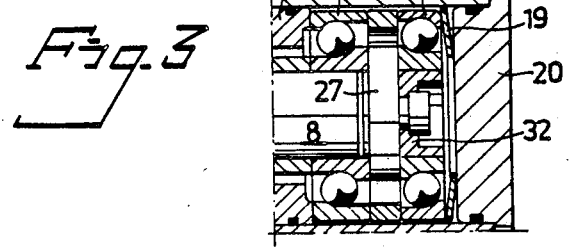

ROTARY MACHINE EQUIPPED WITH A THRUST BALANCING ARRANGEMENT

BACKGROUND OF THE INVENTION

The present invention relates to a rotary machine equipped with a thrust balancing arrangement.

A machine of this kind comprising two helical rotors which are journalled in thrust bearings at both ends thereof is known from U.S. Pat. No. 3,388,854. In order to obtain uniform distribution of the load on the thrust bearings and a long useful bearing life, while avoiding the transition to larger bearings—which normally presents a problem due to the lack of space for accommodating bearings of larger diameter—the known machine is provided with a thrust balancing arrangement comprising a piston-cylinder device which under the influence of pressure fluid contingent on one working condition of the machine exerts an axial thrust on one rotor through the thrust bearing on the low pressure side of the machine. This axial thrust is exerted in a direction opposite to the direction in which the working fluid acts and also in an opposite direction to the bias of a spring means acting on the thrust bearing.

The length of the useful life of the machine depends upon the condition of the thrust bearings. The bearings need to be inspected at regular intervals and must be changed when necessary. A bearing change is difficult to carry out and requires skill and experience on the part of the engineer concerned. For example, when effecting a bearing change it is necessary to dismantle the thrust balancing arrangement, together with associated connections and seals, and then to reassemble the thrust balancing arrangement and test the efficiency of the seals, which involves further work and also the risk of faults occurring as a result of dismantling the thrust balancing arrangement, etc.

OBJECT AND SUMMARY OF THE INVENTION

The object of the present invention is to provide a machine of the aforementioned kind in which the thrust balancing arrangement is constructed in a manner which will enable the thrust bearing to be checked and changed without undue difficulty, and which will extend the useful life of the thrust bearings.

This object is achieved in accordance with the invention with a machine having the characteristic features set forth in the following claims.

The fact that the auxiliary thrust bearing is located on the extremity of the shaft journal and is clamped resiliently between the thrust balancing arrangement and the spring means, enables the thrust bearing to be checked and changed easily, even by unskilled workmen. The relative ease with which the auxiliary bearing can be replaced can be utilized suitably by placing a relatively heavy load on the auxiliary thrust bearing and by lessening the load on the remaining bearings to a corresponding extent, therewith prolonging the useful life of the bearings. The auxiliary bearing on the other hand, enjoys a shorter useful life. This is of minor importance, however, since the auxiliary bearing can be readily changed, for instance when carrying out routine maintenance service.

The auxiliary thrust bearing may also be active when starting and stopping the machine, when the working fluid is under no pressure, or only a slight pressure, i.e. at low speeds which result in unproportional wear on the bearing. This is a further reason as to why it should be easy to replace the auxiliary thrust bearing.

According to one preferred embodiment of the invention, the annular piston-cylinder device of the thrust balancing arrangement has the form of a "plug-in" unit, therewith enabling said device to be readily removed and replaced without risk of causing a leakage as a result thereof.

BRIEF DESCRIPTION OF THE DRAWINGS

The invention will now be described in more detail with reference to exemplifying embodiments thereof illustrated in the accompanying schematic drawings, in which:

FIG. 1 is a side view of a machine constructed in accordance with the invention;

FIG. 2 is a longitudinal, sectional view of the bearing arrangement on the high-pressure side of the machine; and FIG. 3 is a part sectional view showing a modification to the auxiliary bearing illustrated in FIG. 2.

DETAILED DESCRIPTION

FIG. 1 illustrates very schematically a screw compressor which comprises a housing 1 which has a low-pressure side 2 and a high-pressure side 3, and which incorporates a working-fluid inlet channel 4 and a working-fluid outlet channel 5, the working fluid being a refrigerant for example. Journalled for rotation in he housing 1 are two helical rotors 6, 7. As shown in FIG. 2, which is a horizontal, sectional view taken through the geometric centre line of the rotor shafts, a journal shaft 8 on the high-pressure end of the right-hand rotor 7, which is a male rotor and is seen from above, is journalled primarily in a radial bearing 10 and two mutually matching thrust ball-bearings 11. Despite the difficulties involved with the illustrated arrangement of double, so-called matched ball-bearings 11, such an arrangement is necessary due to the high axial forces to which the bearings are subjected and the requirement of a long useful life of the bearings, and because the space around the journal shaft 8 on this end of the rotor is restricted and cannot accommodate the use of larger thrust bearings.

The bearing arrangement is located in a cylindrical recess 14 in the high-pressure end 3 of the housing. The recess 14 also accommodates a thrust balancing arrangement in the form of an annular piston-cylinder device 15, 16, which is mounted for sliding movement in the recess. Also arranged for sliding movement in the recess 14, axially outwards of the piston-cylinder device 15, 16, is the outer ring of an auxiliary bearing 17 and a distance sleeve 18 which abuts resiliently against a cup spring 19 located on the inside of a cover plate 20, which closes the recess 14.

Mutually facing surfaces of the piston 15 and cylinder 16 define therebetween an annular chamber 21 which communicates with a pressure-medium channel 22 extending through the wall of the housing 1 and which accommodates a thrust spring which holds the components apart. In order to prevent pressure fluid leaking from the chamber 21, the piston 15 is provided with a sealing ring 23 which seals against the recess 14, whereas the cylinder 16 is provided with a first sealing ring 24, which seals against the recess 14, and a second sealing ring 25, which seals against the piston 15.

The inner rings of the radial bearing 10 and the thrust bearings 11, a distance sleeve 26, and the inner ring of the auxiliary thrust bearing 17 are clamped on the journal shaft 8 by means of a lock plate 27 which is firmly screwed onto the end of said shaft.

The auxiliary bearing 17 is of the kind which is able to transfer thrust in both directions. When the rotary machine is stationary or when the pressure acting on the fluid in the chamber 21 is low, the rotor 7 is held pressed towards the low-pressure side 2 of the cup spring 19, the force of which is transmitted to the rotor 7 through the distance sleeve 18, the auxiliary bearing 17, the distance sleeve 26, and the inner rings of respective bearings 11.

When the rotor machine is started and begins to build up speed, the pressure exerted by the working medium on the end surfaces of the rotors 6, 7 on the high-pressure side will increase, therewith increasing the load on the thrust bearings 11. The pressure acting on the fluid in the chamber 21 will also increase at the same time, causing the piston 15 to be brought into abutment with the outer rings of respective bearings 11 and the cylinder 16 to be brought into abutment with the outer ring of the auxiliary bearing 17, against the action of the cup spring 19. The lock plate 27, and therewith the whole of the rotor 7, will thus be urged towards the high-pressure side 3 of the machine, therewith reducing the load on the bearings 11.

By mutually adapting the pressure in the chamber 21 and the area of the cylinder 16 in said chamber, it is possible to distribute the load exerted axially by the rotor 7 on the bearings 11 and the auxiliary bearing 17 in a manner which will afford the requisite length of useful life of the bearings 11. It is possible to accept, without detriment, a relatively heavy load on the auxiliary bearing 17, which also has to take-up the load exerted by the cup spring 19, since the auxiliary bearing can be changed readily as a matter of routine when carrying out a service, without involving either the bearings 11 or the pistoncylinder device 15, 16 and its connection 22. Removal of the cover plate 20 and the lock plate 27 enables the sleeve 18 and the auxiliary bearing 17 to be withdrawn from the recess 14. If necessary it is also possible to withdraw the thrust balancing arrangement 15, 16 without needing to touch the pressure-fluid connection.

The auxiliary bearing need not be a bearing of the kind illustrated in FIG. 2, which is capable of taking up axial loads in both directions, but may comprise two separate bearings, for instance as illustrated in FIG. 3. With regard to the balancing of thrust, the FIG. 3 embodiment includes a bearing 30 which corresponds to the bearing 17 of the FIG. 2 embodiment. However, the embodiment illustrated in FIG. 3 includes a further bearing 31 which is intended to transmit thrust from the cup spring 19 to the lock plate 27 at low machine speeds and when the machine is stationary, this further bearing being located between the aforesaid two components and being centred on the lock plate by means of a hub 32. This solution is less refined than the solution afforded by the FIG. 2 embodiment and also has the disadvantage that the bearing 31 is constantly subjected to pressure by the cup spring 19, to a greater or lesser extent.

I claim:
1. A rotary machine, comprising:
   a housing (1) having a low-pressure side (2), a high-pressure side (3), a working-fluid inlet channel (4) for receiving a working fluid, a working-fluid outlet channel (5), thrust bearing (11) mounted in the housing, a rotor (7) which is rotatably journalled in the housing by means of a rotor journal shaft (8) and which during rotation is subjected to an axial load by the working fluid in a direction towards the low-pressure side (2) and towards the thrust bearings (11), and a thrust balancing arrangement (15, 16) in the housing, and said rotor also being subjected to an axial load in a direction towards the high-pressure side (3) by the thrust balancing arrangement (15, 16);
   the thrust balancing arrangement comprising an auxiliary thrust bearing (17), an axially acting spring means (19) for urging the rotor (7) towards the low-pressure side (2) of the housing, and a piston-cylinder device which, under the influence of pressure fluid contingent on the operating conditions of the machine, partially relieves a load on the thrust bearings (11) by means of the auxiliary thrust bearing (17) which is arranged for limited movement against the action of the axially acting spring means (19), the spring means (19) generating an urging force sufficient to hold the rotor (17) urged towards the low-pressure side (2) when the thrust balancing arrangement (15, 16) is substantially inactive when starting and stopping the machine;
   a locking device (27) detachably mounted on an outermost part of the rotor journal shaft (8) at the high-pressure side (3) of the housing;
   the auxiliary thrust bearing (17) being mounted on an outermost part of the rotor journal shaft (8) at the high-pressure side (3) of the housing, between the locking device (27) which locks the auxiliary thrust bearing (17) and the thrust balancing arrangement (15, 16); and
   the thrust balancing arrangement being located axially inwards of the auxiliary thrust bearing (17) and the pistoncylinder device of the thrust balancing arrangement comprising two annular parts (15, 16) which are axially expandable in a cylindrical recess (14) in the housing (1).
2. The rotary machine of claim 1, wherein the auxiliary thrust bearing (30 FIG. 3) comprises:
   a roller bearing having an inner ring which is secured on the journal shaft (8) by means of the locking device (27); and
   an outer ring which is located between the thrust balancing arrangement (15, 16) and the spring means (19) via an outer ring of a further roller bearing (31) having an inner ring mounted on the journal shaft (8), said further roller bearing (31) transferring an axial force between the spring means (19) and the journal shaft (8).
3. The rotary machine of claim 1, wherein the auxiliary thrust bearing comprises:
   a ball-bearing (17) capable of taking-up axial forces in both directions, and having an inner ring which is secured on the journal shaft (8) by means of the locking device (27), and
   an outer ring which is located between the thrust balancing arrangement (15, 16) and the spring means (19).
4. The rotary machine of any one of claims 1, 2 or 3, wherein the annular piston-cylinder device of the thrust balancing arrangement (15, 16) further comprises:
   a radial chamber (21) for accommodating pressure fluid;
   two annular sealing devices (23, 24) which are arranged on the thrust balancing arrangement and which sealingly abut the cylindrical recess (14) in the housing;

the radial chamber (21) being arranged between said annular sealing devices (23, 24); and a pressure fluid channel (22) provided in the housing (1) and discharging into the cylindrical recess (14) at a location opposite the radial chamber (21).

5. The rotary machine of any one of claims 1, 2 or 3, wherein said spring means (19) comprises a cup spring.

* * * * *